United States Patent

[11] 3,590,555

| [72] | Inventor | Rudolf Wackernagel |
| | | Dortmund, Germany |
| [21] | Appl. No. | 780,538 |
| [22] | Filed | Dec. 2, 1968 |
| [45] | Patented | July 6, 1971 |
| [73] | Assignee | Friedrich Uhde GmbH |
| | | Dortmund, Germany |
| [32] | Priority | Dec. 9, 1967 |
| [33] | | Germany |
| [31] | | P 16 69 337.1 |

[54] METHOD FOR REMOVAL OF HYDROGEN SULFIDE FROM HYDROCARBON CONTAINING GASES
4 Claims, 2 Drawing Figs.

[52] U.S. Cl. ................................................. 55/51, 55/73, 55/89
[51] Int. Cl. ............................................... B01d 53/00
[50] Field of Search ........................................... 23/165, 181; 55/36—44, 46—49, 51—56, 73, 84

[56] References Cited
UNITED STATES PATENTS

| 3,334,469 | 8/1967 | Deicher et al. | 55/73 X |
| 3,362,133 | 1/1968 | Kutsher et al. | 55/73 X |

FOREIGN PATENTS

| 748,251 | 12/1966 | Canada | 55/73 X |

*Primary Examiner*—Samih N. Zaharna
*Assistant Examiner*—R. W. Burks
*Attorney*—Malcolm W. Fraser ABSTRACT: A method for removal of hydrogen sulfide from hydrocarbon containing gases by means of pressure washing with subsequent regeneration of the charged washing means which consists of ester of phosphonic acid or the derivatives of this ester. The charged washing means is intermediarily released from pressure and the intermediary expansion gas is conveyed back to the absorber after compression. The desorption heat expended in the regeneration is partially or entirely removed from the washing means and cooling thereof is utilized through a heat exchanger for cooling the fully regenerated washing means.

METHOD FOR REMOVAL OF HYDROGEN SULFIDE FROM HYDROCARBON CONTAINING GASES

BACKGROUND OF THE INVENTION

The invention relates to a method for the removal of hydrogen sulfide from gases which chiefly are under high pressure, as for example, natural gas, and which may contain further constituents besides hydrocarbons and hydrogen sulfide, such as carbon dioxide, nitrogen, mercaptans, etc. For carrying out such method, the pressure washing methods which also are designated as physical washing methods were found to be more advantageous as compared to the chemical washing method, with which is counted for example, the potassium-carbonate-washing.

The economy of the physical washing method is determined by the characteristics of the washing means utilized. There has been suggested therefore an entire series of organic solvents having physical effect for carrying out a method for the removal of above all, hydrogen sulfide from hydrocarbon containing gases. It has been established that the chemical resistance of these substances leaves something to be desired and that the decomposition products occurring with operational stresses might give rise to disturbances in the installation.

SUMMARY OF THE INVENTION

It is a desideratum to find a solvent for the removal of hydrogen sulfide from hydrocarbon containing gases, which is chemically stable and has as low as possible a corrosiveness with respect to the apparatus of the washing installation, and at the same time also fulfills particularly well the requirements or demands made on the solvent.

Particularly adapted for this purpose are the esters of phosphonic acid and the derivatives of these esters. These compositions are very stable, and in addition to a low vapor pressure and low viscosity, which are to be required of a suitable solvent, they have to a surprising extent also a substantially greater solubility for hydrogen sulfide and for example carbon dioxide, as compared with the known organic solvents, such as for example the tri-n-butylphosphate mentioned in the German Pat. No. 54,673.

The method according to the invention, for the removal of hydrogen sulfide from hydrocarbon-containing gases by means of a pressure washing with subsequent regeneration of the charged washing means is accordingly characterized in this, that esters of phosphonic acids or the derivatives of these esters are utilized as washing means.

DESCRIPTION OF PREFERRED EMBODIMENT

Figure 1:
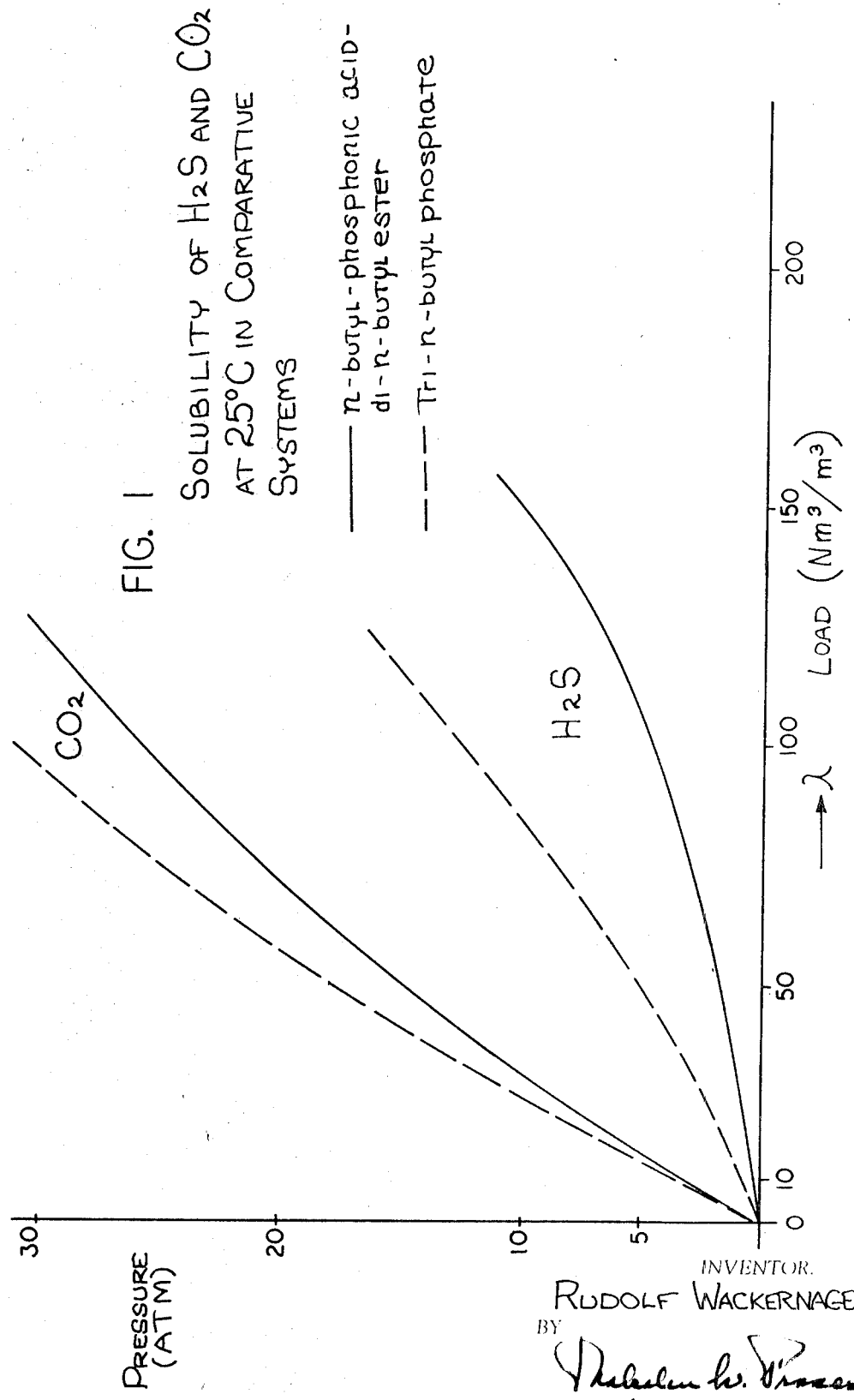
FIG. 1 is a comparative diagram showing the solubility of hydrogen sulfide and carbon dioxide in n-butyl-phosphonic acid-di-n-butyl ester and also in the known tri-n-butyl phosphate.

As example there is shown in FIG. 1 the solubility of hydrogen sulfide and carbon dioxide in n-butyl-phosphonic acid-di-n-butyl ester and in the known tri-n-butylphosphate. The solubilities in both washing means were determined under similar conditions in similar equipment. With the ordinals is indicated the partial pressure of the gas constituent and with the abscissae the quantity of gas absorbed per quantity of solvent. In addition to the particularly good capability of absorption of the phosphonic acid ester, there is also to be recognized from the drawing a favorable selectivity of the absorption with respect to carbon dioxide.

It was also found that the solubility in the washing means for methane according to the invention is very low, while for the heavier hydrocarbons, such as for example, propane, butane and also benzine, the solubility is substantially greater.

This characteristic of the washing means according to the invention makes its utilization particularly advantageous, if from the gas to be purified, for example, natural gas, also heavier hydrocarbons are to be separated off.

The methane absorbed solely in very small quantities may also be conveyed to the gas to be purified as valuable gas constituent after an intermediate pressure release.

Figure 2:
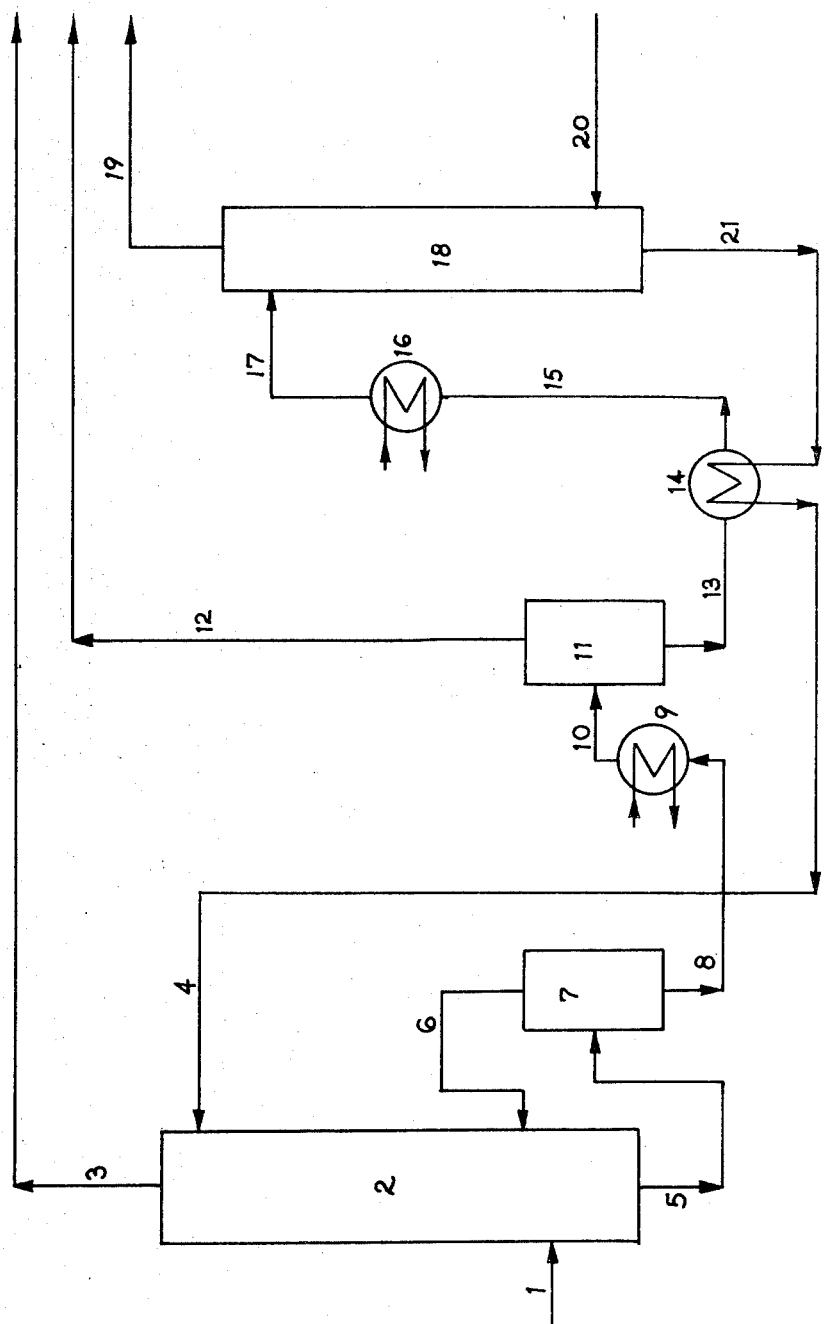
FIG. 2 is a diagrammatic view of a method of removing hydrogen sulfide from hydrocarbon-containing gases by a pressure washing.

The carrying out of the method according to the invention is explained in the following on the basis of the installation shown diagrammatically in FIG. 2. As washing means, there was utilized di-butyl ester of n-butyl-phosphonic acid.

According to this example, 75,000 $Nm^3/h$ of crude gas, consisting of 10 percent by volume of hydrogen sulfide, 12 percent by volume of carbon dioxide and 78 percent by volume of methane is supplied through a conduit 1 to the foot of an absorption column 2, which is constructed as a packed tower or column. At the head of the column 2 is supplied regenerated washing means from a strip column 18 through a conduit 4. It passes through the column in countercurrent from top to bottom to the crude gas introduced at the foot of the column 2, and absorbs at a pressure of 73 atm. the hydrogen sulfide, as well as quantities of carbon dioxide and methane corresponding to the solubility, so that through a conduit 3 leading from the top of the column 2, a pure gas is conveyed off with a hydrogen sulfide residue content of approximately 5 $mg/Nm^3$; besides, there remains in the pure gas approximately 11 percent by volume of carbon dioxide.

The charged washing means, which has been heated to 56° C. by means of the heat released upon absorption, leaves the column 2 through a conduit 5 and is relieved of pressure in column 7 in a one-step intermediary pressure release at 20 atm. The gas released in this way with approximately 15.8 percent by volume of hydrogen sulfide, 23.4 percent by volume of carbon dioxide and 60.8 percent by volume of methane is conveyed back after compression through a conduit 6 into the absorber.

Through a conduit 8, the partially released washing means is conveyed from the column 7 to a cooler 9, where it is cooled by 20° C. and finally reaches through a conduit 10 a main pressure release column 11. Here by means of pressure release to atmospheric pressure, the washing means is partially regenerated.

The expansion gas conveyed off through a conduit 12, 71250 $Nm^3/h$ contains 71 percent by volume of hydrogen sulfide, 22 percent by volume of carbon dioxide and 7 percent by volume of methane. It may be treated further in a Claus-installation to produce sulfur.

Through the desorption heat to be brought up in column 11, the washing means cools by 24° C. As by means of the preconnected cooler 9, the temperature level of the washing means has already dropped, thus a temperature of 12° C. is achieved at the outlet of column 11. In this way it is possible, by means of economical disposition of a heat exchanger 14, to cool the regenerated washing means to 21° C., whereby the partially regenerated washing means is heated. It passes from the heat exchanger 14 through a conduit 15 to a heater 16 where the lacking quantity of heat is supplied. The washing means heated to 80° C. passes through a conduit 17 to the head of a strip column 18.

The washing means is stripped in the countercurrent with 1.250 $Nm^3/h$ inert gas, and accordingly subjected to a final regeneration. It is drawn off at the sump of the strip column 18 through a conduit 21, and by means of feed pumps is conveyed back after cooling in the heat exchanger 14 through the conduit 4 into the column 2 at a temperature of 21° C.

The gas is conveyed out of the head of the strip column 18 through a conduit pressure with 62.4 percent by volume of hydrogen sulfide for further treatment, for example, in a Claus-installation.

What I claim is:

1. Method for the removal of hydrogen sulfide from hydrocarbon containing gases by means of a pressure washing with subsequent regeneration of the charged washing means, characterized in that diesters of phosphonic acids are utilized as a washing means.

2. Method according to claim 1, characterized in that the charged washing means is intermediarily released from pressure and the intermediary expansion gas formed thereby is conveyed back into the absorber after its compression.

3. Method according to claim 1 wherein the washing means is heated to desorption temperature by indirect heat exchange successively with hot regenerated washing means leaving the desorption operation and with an external heating means.

4. Method according to claim 1 wherein the washing means is di-n-butyl ester of n-butylphosphonic acid.